US012598091B2

(12) United States Patent
Jin et al.

(10) Patent No.: US 12,598,091 B2
(45) Date of Patent: Apr. 7, 2026

(54) CONSENSUS METHOD AND APPARATUS, AND BLOCKCHAIN SYSTEM

(71) Applicant: CHINA ACADEMY OF INFORMATION AND COMMUNICATIONS TECHNOLOGY, Beijing (CN)

(72) Inventors: Jian Jin, Beijing (CN); Jiagui Xie, Beijing (CN); Xufeng Ma, Beijing (CN); Jian Guo, Beijing (CN); Bo Zhang, Beijing (CN); Xing Wei, Beijing (CN)

(73) Assignee: CHINA ACADEMY OF INFORMATION AND COMMUNICATIONS TECHNOLOGY, Beijing (CN)

( * ) Notice: Subject to any disclaimer, the term of this patent is extended or adjusted under 35 U.S.C. 154(b) by 157 days.

(21) Appl. No.: 18/691,767

(22) PCT Filed: Jun. 6, 2022

(86) PCT No.: PCT/CN2022/097230
§ 371 (c)(1),
(2) Date: Mar. 13, 2024

(87) PCT Pub. No.: WO2023/040364
PCT Pub. Date: Mar. 23, 2023

(65) Prior Publication Data
US 2025/0132935 A1 Apr. 24, 2025

(30) Foreign Application Priority Data

Sep. 16, 2021 (CN) .......................... 202111085505.9

(51) Int. Cl.
*H04L 9/00* (2022.01)
*H04L 9/32* (2006.01)

(52) U.S. Cl.
CPC .............. *H04L 9/50* (2022.05); *H04L 9/3236* (2013.01)

(58) Field of Classification Search
CPC ....... H04L 9/50; H04L 9/3236; H04L 9/3239; G06Q 40/04
See application file for complete search history.

(56) References Cited

U.S. PATENT DOCUMENTS 10,204,341 B2 * 2/2019 Davis .................. G06F 16/2255
10,977,135 B2 * 4/2021 Yang ...................... G06F 9/4401
(Continued)

FOREIGN PATENT DOCUMENTS

CN 107392608 A 11/2017
CN 109379397 A 2/2019
(Continued)

OTHER PUBLICATIONS

He et al., An Improvement of Consensus Fault Tolerant Algorithm Applied to Alliance Chain, 2019, IEEE, pp. 277-280 (Year: 2019).*
(Continued)

*Primary Examiner* — Yingying Zhou
(74) *Attorney, Agent, or Firm* — BROOKS KUSHMAN P.C.

(57) ABSTRACT

Disclosed are a consensus method and device, and a blockchain system. A primary node directly broadcasts a transaction hash list including a hash value of at least one unverified transaction in the system, so that a backup node and the primary node simultaneously verify the at least one unverified transaction, and the backup node stores a first verification result obtained by verification and a first hash value of the at least one unverified transaction. The primary node broadcasts an obtained second verification result and a second hash value of the at least one unverified transaction in a pre-preparation message after completing the verifica-
(Continued)

tion, so that the backup node searches for the first verification result based on the second hash value, and broadcast a preparation message when the second verification result is the same as the searched first verification result, to enter a subsequent consensus stage, and complete the consensus processing.

16 Claims, 6 Drawing Sheets

(56)                     References Cited

U.S. PATENT DOCUMENTS

| | | | | |
|---|---|---|---|---|
| 11,057,504 | B2 * | 7/2021 | Yang | H04L 69/40 |
| 11,410,171 | B2 * | 8/2022 | Li | G06Q 20/401 |
| 2017/0344987 | A1 | 11/2017 | Davis | |

FOREIGN PATENT DOCUMENTS

| | | |
|---|---|---|
| CN | 111522822 A | 8/2020 |
| CN | 111555858 A | 8/2020 |
| CN | 113541968 A | 10/2021 |

OTHER PUBLICATIONS

International Search Report of PCT/CN2022/097230 mailed Aug. 25, 2022, 5 pages.

* cited by examiner

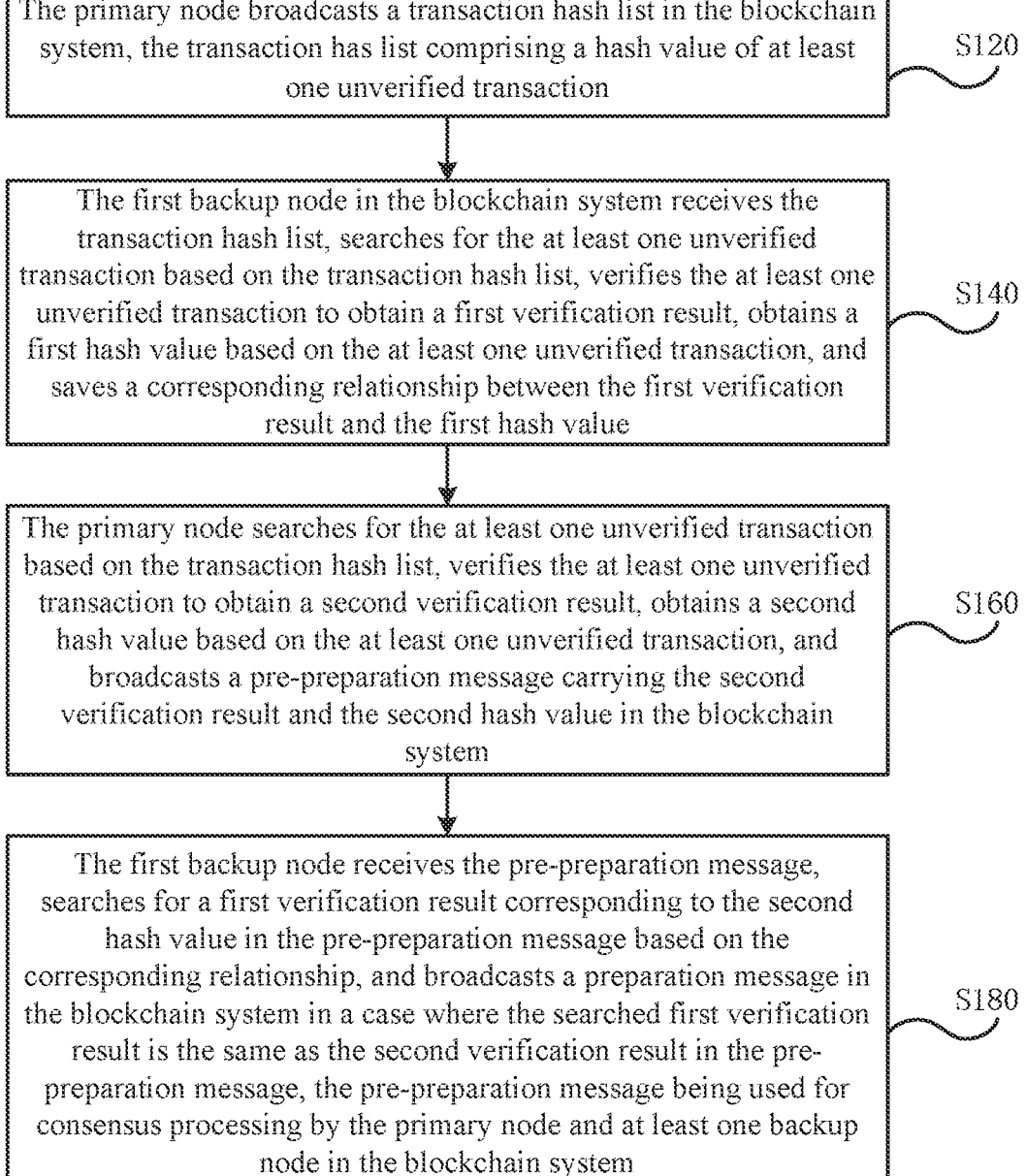

The primary node broadcasts a transaction hash list in the blockchain system, the transaction has list comprising a hash value of at least one unverified transaction    S120

The first backup node in the blockchain system receives the transaction hash list, searches for the at least one unverified transaction based on the transaction hash list, verifies the at least one unverified transaction to obtain a first verification result, obtains a first hash value based on the at least one unverified transaction, and saves a corresponding relationship between the first verification result and the first hash value    S140

The primary node searches for the at least one unverified transaction based on the transaction hash list, verifies the at least one unverified transaction to obtain a second verification result, obtains a second hash value based on the at least one unverified transaction, and broadcasts a pre-preparation message carrying the second verification result and the second hash value in the blockchain system    S160

The first backup node receives the pre-preparation message, searches for a first verification result corresponding to the second hash value in the pre-preparation message based on the corresponding relationship, and broadcasts a preparation message in the blockchain system in a case where the searched first verification result is the same as the second verification result in the pre-preparation message, the pre-preparation message being used for consensus processing by the primary node and at least one backup node in the blockchain system    S180

CONSENSUS METHOD AND APPARATUS, AND BLOCKCHAIN SYSTEM

CROSS-REFERENCE TO RELATED APPLICATIONS

This application is a U.S. national phase of International Application No. PCT/CN2022/097230, filed on Jun. 6, 2022, which claims priority to Chinese Patent Application No. 202111085505.9, filed on Sep. 16, 2021, entitled "Consensus Method and Device, and Blockchain System", the disclosures of which are hereby incorporated in their entirety by reference herein.

TECHNICAL FIELD

The disclosure relates to a technical field of blockchain, and relates to a consensus method and device, and a blockchain system.

BACKGROUND

Practical Byzantine Fault Tolerance (PBFT) algorithm may improve correctness of a blockchain system (for example, to avoid bifurcation) in a case where a proportion of evil nodes in the system is less than one-third. In a blockchain system adopting the PBFT algorithm, every time a block is generated, a round of consensus is generally required. The round of consensus is a process in which a block initiator generates a block and broadcasts the block in the system, and another block verifier(s) verifies the block. The block initiator may also be referred to a "primary node" (or "primary"), and the another block verifier(s) may be referred to a "backup node(s)" (or "backup(s)").

SUMMARY

Embodiments of the disclosure disclose a consensus method and device, and a blockchain system, for improving a consensus efficiency for a block verification.

In an aspect of the disclosure, disclosed is a consensus method comprising:

broadcasting a transaction hash list in a blockchain system so that a backup node in the blockchain system receives the transaction hash list, the transaction hash list comprising a hash value of at least one unverified transaction, searching for the at least one unverified transaction based on the transaction hash list, verifying the at least one unverified transaction to obtain a first verification result, obtaining a first hash value based on the at least one unverified transaction, and saving a corresponding relationship between the first verification result and the first hash value;

searching for the at least one unverified transaction based on the transaction hash list, verifying the at least one unverified transaction to obtain a second verification result, and obtaining a second hash value based on the at least one unverified transaction; and broadcasting a pre-preparation message in the blockchain system, so that the backup node searches for the first verification result corresponding to the second hash value based on the corresponding relationship, the pre-preparation message comprising the second verification result and the second hash value; and broadcasting a preparation message in the blockchain system in a case where the searched first verification result is the same as the second verification result, the preparation message being used for consensus processing by a primary node and a backup node in the blockchain system.

In another aspect of the disclosure, disclosed is a consensus method applied to a first backup node in a blockchain system further comprising a primary node, the method comprising:

receiving a transaction hash list broadcast by the primary node, the transaction hash list comprising a hash value of at least one unverified transaction;

searching for the at least one unverified transaction based on the transaction hash list, verifying the at least one unverified transaction to obtain a first verification result, obtaining a first hash value based on the at least one unverified transaction, and saving a corresponding relationship between the first verification result and the first hash value;

receiving a pre-preparation message broadcast by the primary node, the pre-preparation message comprising a second verification result obtained by verifying the at least one unverified transaction by the primary node and a second hash value obtained based on the at least one unverified transaction; and searching for a first verification result corresponding to the second hash value in the pre-preparation message based on the corresponding relationship, and broadcasting a preparation message in the blockchain system in a case where the searched first verification result is the same as the second verification result, the preparation message being used for consensus processing by the primary node and at least one backup node in the blockchain system.

In another aspect of the disclosure, disclosed is a consensus device comprising a broadcasting module and a verification module;

wherein the broadcasting module is configured to broadcast a transaction hash list in a blockchain system so that a backup node in the blockchain system receives the transaction hash list, the transaction hash list comprising a hash value of at least one unverified transaction; to search for the at least one unverified transaction based on the transaction hash list, to verify the at least one unverified transaction to obtain a first verification result, to obtain a first hash value based on the at least one unverified transaction, and to save a corresponding relationship between the first verification result and the first hash value;

wherein a first verification module is configured to search for the at least one unverified transaction based on the transaction hash list, to verify the at least one unverified transaction to obtain a second verification result, and to obtain a second hash value based on the at least one unverified transaction; and wherein the broadcasting module is further configured to broadcast a pre-preparation message in the blockchain system so that the backup node searches for the first verification result corresponding to the second hash value based on the corresponding relationship, the pre-preparation message comprising the second verification result and the second hash value; and to broadcast a preparation message in the blockchain system in a case where the searched first verification result is the same as the second verification result, the preparation message being used for consensus processing by a primary node and a backup node in the blockchain system.

In another aspect of the disclosure, disclosed is a consensus device applied to a first backup node in a blockchain system further comprising a primary node, the device comprising a receiving module, a verification module and a verification result comparison module;

wherein the receiving module is configured to receive a transaction hash list broadcast by the primary node, the transaction hash list comprising a hash value of at least one unverified transaction;

wherein a second verification module is configured to search for the at least one unverified transaction based on the transaction hash list, to verify the at least one unverified transaction to obtain a first verification result, to obtain a first hash value based on the at least one unverified transaction, and to save a corresponding relationship between the first verification result and the first hash value;

the receiving module is further configured to receive a pre-preparation message broadcast by the primary node, the pre-preparation message comprising a second verification result obtained by verifying the at least one unverified transaction by the primary node and a second hash value obtained based on the at least one unverified transaction; and the verification result comparison module is configured to search for the first verification result corresponding to the second hash value in the pre-preparation message based on the corresponding relationship, and to broadcast a preparation message in the blockchain system in a case where the first verification result is the same as the second verification result, the preparation message being used for consensus processing by the primary node and respective backup nodes in the blockchain system.

In another aspect of the disclosure, disclosed is a blockchain system comprising a primary node and a first backup node, the first backup node being any one backup node in the blockchain system;

wherein the primary node is configured to broadcast a transaction hash list in the blockchain system, the transaction hash list comprising a hash value of at least one unverified transaction;

wherein the first backup node is configured to receive the transaction hash list, to search for the at least one unverified transaction based on the transaction hash list, to verify the at least one unverified transaction to obtain a first verification result, to obtain a first hash value based on the at least one unverified transaction, and to save a corresponding relationship between the first verification result and the first hash value;

wherein the primary node is further configured to search for the at least one unverified transaction based on the transaction hash list, to verify the at least one unverified transaction to obtain a second verification result, to obtain a second hash value based on the at least one unverified transaction, and to broadcast a pre-preparation message carrying the second verification result and the second hash value in the blockchain system; and wherein the first backup node is further configured to receive the pre-preparation message, to search for the first verification result corresponding to the second hash value based on the corresponding relationship, and to broadcast a preparation message in the blockchain system in a case where the searched first verification result is the same as the second verification result, the preparation message being used for consensus processing by the primary node and at least one backup node in the blockchain system.

In yet another aspect of the disclosure, disclosed is a computer-readable storage medium, on which a program code is stored, and the program code may be called and executed by a processor to implement the consensus method disclosed by any one of the above embodiments of the disclosure.

In the embodiments of the disclosure, the primary node directly broadcasts the transaction hash list comprising the hash value of the at least one unverified transaction in the blockchain system so that the backup node and the primary node simultaneously verify the at least one unverified transaction, and the backup node stores the first verification result obtained by verification and the first hash value of the at least one unverified transaction. The primary node broadcasts the obtained second verification result and the second hash value of the at least one unverified transaction in the pre-preparation message after completing the verification, so that the backup node may search for the first verification result based on the second hash value, and broadcast the preparation message in a case where the second verification result is the same as the searched first verification result, to enter a subsequent consensus stage, and complete the consensus processing. In this way, the primary node and the backup node may simultaneously verify the unverified transactions that need to be put on a blockchain in this round of consensus, which may speed up the consensus process and improve the consensus efficiency.

The disclosure will be described in further detail with reference to the drawings and embodiments.

BRIEF DESCRIPTION THE DRAWINGS

The accompanying drawings, as a part of the specification, illustrate the embodiments of the disclosure, and illustrate principles of the disclosure together with the description.

The disclosure may be more clearly understood from the following detailed description with reference to the accompanying drawings. Obviously, the drawings in the following description are only some embodiments of the disclosure. For those skilled in the art, other drawings may be obtained according to these drawings without creative labor.

FIG. 2 is a flowchart of an embodiment of a consensus method of the disclosure;

DETAILED DESCRIPTION

Figure 1:
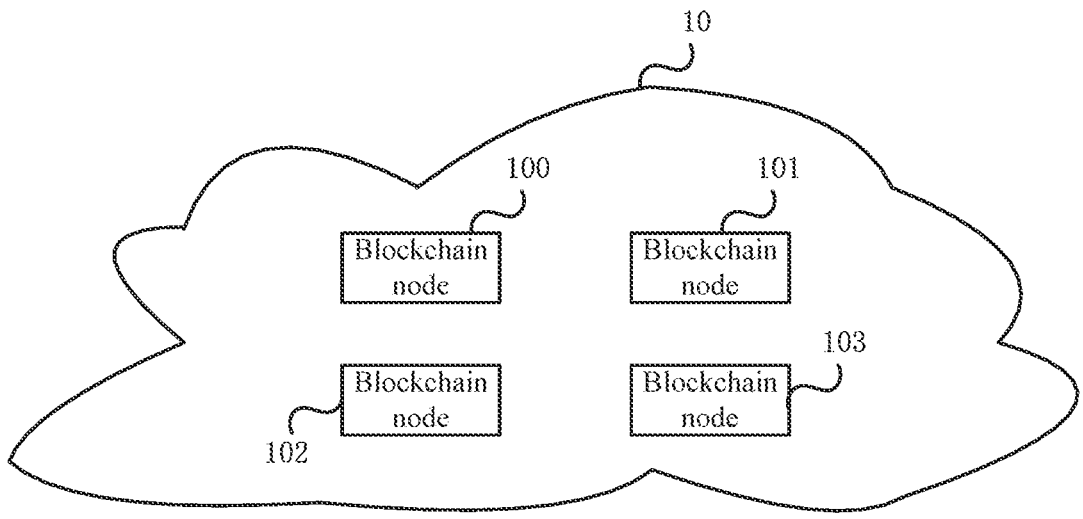
FIG. 1 is an architecture diagram of a blockchain system disclosed in an embodiment of the disclosure.

Various exemplary embodiments of the disclosure will now be described in detail with reference to the accompanying drawings. It is noted that the relative arrangement, numerical expressions and numerical values of components and steps set forth in these embodiments do not limit the scope of the disclosure unless otherwise specified.

It is also understood that in the embodiments of the disclosure, "a plurality of" may refer to two or more, and "at least one" may refer to one, two or more.

It may be understood by those skilled in the art that terms such as "first" and "second" in the embodiments of this disclosure are only used to distinguish different steps, devices, or modules, and do not represent any specific technical meaning or their inevitable logical order.

It is also understood that any component, data, or structure mentioned in the embodiments of the disclosure may generally be understood as one or more components, data, or structures, unless explicitly defined or given contrary enlightenment in the context.

It is also understood that descriptions of various embodiments in this disclosure focus on differences between various embodiments, and the same or similar parts may serve as references for each other, and will not be repeated for sake of brevity.

The description of at least one exemplary embodiment below is only illustrative, and in no way should it be taken as any limitation on the disclosure, its application or uses.

Technologies, methods, and equipment known to ordinary skilled in related art may not be discussed in detail, but in appropriate cases, they are a part of the specification.

It is noted that similar reference numerals and letters indicate similar elements in the following figures, and an item, which has been defined in one figure, will not be further discussed in the other figures.

In addition, term "and/or" herein is only an association relationship describing the associated objects, which means that there may be three kinds of relationships. For example, A and/or B may mean A alone, A and B, and B alone. In addition, a character "/" herein generally indicates that the two associated objects are in an "or" relationship.

The embodiments of the disclosure may be applied to electronic equipment such as terminal equipment, computer systems, servers, and the like, which may be operated together with many other general-purpose or special-purpose computing system environments or configurations. Examples of well-known terminal equipment, computing systems, environments and/or configurations suitable for use with terminal equipment, computer systems, servers and other electronic equipment include, but are not limited to, personal computer systems, server computer systems, thin clients, thick clients, handheld or laptop equipment, microprocessor-based systems, set-top boxes, programmable consumer electronics, network personal computers, small computer systems, mainframe computer systems and distributed cloud computing technology environments including any of the above systems.

Terminal equipment, computer systems, servers and other electronic equipment may be described in the general context of computer system executable instructions (such as program modules) executed by computer systems. Generally, program modules may include routines, programs, object programs, components, logic, data structures, etc., which perform particular tasks or implement particular abstract data types. Computer systems/servers may be implemented in a distributed cloud computing environment where tasks are performed by remote processing equipment linked through a communication network. In the distributed cloud computing environment, program modules may be located on local or remote computing system storage media including storage equipment.

In order to make the technical scheme and advantages of the embodiments of the disclosure clearer, exemplary embodiments of the disclosure will be described in detail below with reference to the attached drawings. Obviously, the described embodiments are only part of the embodiments of the disclosure, but not an exhaustive list of all the embodiments. It is noted that the embodiments in the disclosure and the features in the embodiments may be combined with each other without conflict.

FIG. 1 is an architecture diagram of a blockchain system 10 disclosed in an embodiment of the disclosure, which comprises a plurality of blockchain nodes, such as a blockchain node 100, a blockchain node 101, a blockchain node 102 and a blockchain node 103. A number of the blockchain nodes in the blockchain system 10 is 3f+1, wherein f represents a number of Byzantine nodes in the blockchain system 10, that is, a number of malicious or faulty nodes. In other words, there are at least 2f+1 non-Byzantine nodes in the blockchain system 10, and these nodes may perform consensus processing according to the consensus method disclosed in the embodiments of the disclosure. Backup nodes in the blockchain system 10 are peer nodes and may communicate with each other. It may be understood that a blockchain node mentioned in an embodiment of this disclosure may be, for example, terminal equipment (such as a tablet computer, a notebook computer, and a personal computer) or a server, and the server herein may be an independent physical server, a server cluster including multiple physical servers, and a cloud server providing basic cloud computing services such as cloud computing and big data, which is not limited by the embodiment of the disclosure.

FIG. 2 is a flowchart of a consensus method disclosed in an embodiment of the disclosure, which may be applied to the blockchain system 10 shown in FIG. 1. In a round of consensus, any node in a plurality of blockchains in the blockchain system 10 shown in FIG. 1 is selected as a primary node (i.e., a blockchain initiator), and the rest of the blockchain nodes serve as backup nodes (i.e., blockchain verifiers). For the convenience of understanding, the consensus method disclosed in this embodiment is introduced by taking the blockchain node 100 as the primary node, and the blockchain node 101, the blockchain node 102 and the blockchain node 103 as the backup nodes, which for example comprises the following steps.

In S120, the primary node broadcasts a transaction hash list in the blockchain system, the transaction hash list comprising a hash value of at least one unverified transaction.

In an optional example, S120 may be executed by a processor calling corresponding instructions stored in a memory, or may be executed by a broadcasting module controlled by the processor.

In an implementation, the primary node (such as the blockchain node 100 in FIG. 1) may acquire a hash value of at least one transaction to be packaged into a block from a local transaction pool, and turn the acquired hash values into a transaction hash list in S120. Here, the at least one transaction to be packaged into a block refers to a transaction to be put on a blockchain in this round of consensus. Before verifying the at least one transaction to be packaged into a block, the primary node may broadcast the transaction hash list in the blockchain system 10, based on which a transaction to be packaged into a block is called "unverified transaction" in this embodiment.

For example, in this embodiment, the transaction hash list may be broadcast in a pre-block message, and correspondingly, the stage of broadcasting the pre-block message may be called a pre-block stage. In other words, the consensus method disclosed in the embodiment of the disclosure may add a pre-block stage on the basis of a pre-prepare stage, a prepare stage and a commit stage included in a Practical Byzantine Fault Tolerance (PBFT) consensus process. Refer to the related introduction below for details.

The pre-block message broadcast by the primary node may be received by a backup node in the blockchain system 10 shown in FIG. 1. In other words, the primary node broadcasts the transaction hash list in the blockchain system 10, so that a backup node in the blockchain system 10 may perform S140 described below as a first backup node.

In S140, the first backup node in the blockchain system receives the transaction hash list, searches for the at least one unverified transaction based on the transaction hash list, verifies the at least one unverified transaction to obtain a first verification result, obtains a first hash value based on the at least one unverified transaction, and saves a corresponding relationship between the first verification result and the first hash value.

In an optional example, S140 may be executed by a processor calling corresponding instructions stored in a memory, or may be executed by a second verification module controlled by the processor.

It is noted that in this embodiment, the processing flows of different backup nodes may be similar. Any backup node in the blockchain system 10 may be regarded as the first backup node, and in a case where one backup node is regarded as the first backup node, the other backup nodes may be regarded as second backup nodes. For example, in a case where the blockchain node 101 shown in FIG. 1 is taken as the first backup node, both the blockchain node 102 and the blockchain node 103 may be regarded as the second backup nodes. In another example, in a case where the blockchain node 102 shown in FIG. 1 is taken as the first backup node, both the blockchain node 101 and the blockchain node 103 may be regarded as the second backup nodes.

After receiving the pre-block message, the first backup node may obtain the transaction hash list in the pre-block message, and any hash value in the transaction hash list corresponds to an unverified transaction. For example, the unverified transaction tx–1 corresponds to the hash value hs–1, which means that hs–1 may be obtained by performing hash calculation on tx–1.

For at least one hash value in the transaction hash list, the first backup node may acquire the unverified transaction corresponding to the hash value from the local transaction pool, so that the original transaction data of at least one unverified transaction to be put on a blockchain in this round of consensus may be obtained. The first backup node may splice the acquired unverified transactions into a transaction hash list, initiate a verification of the transaction hash list locally, and determine illegal transactions in the transaction hash list, such as overtime transactions, invalid transactions, and the like. For example, due to the performance problems of blockchain nodes, the consistency of execution results of some transactions may be problematic, which may be called overtime transactions. In another example, in a case where a balance of a transaction is insufficient, the transaction may not be able to be executed, and the transaction and subsequent transactions of a source account of the transaction may be called invalid transactions.

After the verification is completed, the first backup node may generate verification result information of the illegal transactions, to obtain a first verification result including at least the verification result information of the illegal transactions generated by the first backup node. The first backup node may also perform hash calculation on at least one unverified transaction acquired this time to obtain a first hash value. It is understood that the first hash value may be a hash value of all unverified transactions acquired by the first backup node. Then, the first backup node may locally save a corresponding relationship between the first hash value and the first verification result. For example, a key-value pair may be formed with the first hash value as the key and the first verification result as the value, and the key-value pair may be saved locally.

In S160, the primary node searches for the at least one unverified transaction based on the transaction hash list, verifies the at least one unverified transaction to obtain a second verification result, obtains a second hash value based on the at least one unverified transaction, and broadcasts a pre-preparation message carrying the second verification result and the second hash value in the blockchain system.

In an optional example, S160 may be executed by a processor calling corresponding instructions stored in a memory, or may be executed by a first module controlled by the processor.

In this embodiment, S160 and S140 may be executed concurrently.

In an implementation, the primary node broadcasts the pre-block message and then enters the pre-prepare stage. In this embodiment, the primary node may acquire the original transaction data of the corresponding unverified transaction from the local transaction pool according to any hash value in the transaction hash list in the pre-prepare stage, and verify the acquired unverified transaction. The example flow of verification may be similar to the flow of verification of unverified transactions by the first backup node.

After determining an illegal transaction from the acquired unverified transactions, the primary node may generate the verification result information of the illegal transaction, and then obtain a second verification result including the verification result information of the illegal transaction generated by the primary node. The primary node may also perform hash calculation on the whole acquired unverified transaction to obtain a second hash value. Then, the primary node may broadcast a pre-preparation message in the blockchain system 10, wherein the pre-preparation message includes the second verification result and the second hash value. The pre-preparation message may be received by a backup node in the blockchain system 10. In other words, the primary node broadcasts the pre-preparation message in the blockchain system 10, so that any backup node in the blockchain system 10 may perform S180 described below as the first backup node.

In S180, the first backup node receives the pre-preparation message, searches for a first verification result corresponding to the second hash value in the pre-preparation message based on the corresponding relationship, and broadcasts a preparation message in the blockchain system in a case where the searched first verification result is the same as the second verification result in the pre-preparation message, the preparation message being used for consensus processing by the primary node and at least one backup node in the blockchain system.

In an optional example, S180 may be executed by a processor calling corresponding instructions stored in a memory, or may be executed by a broadcasting module controlled by the processor.

In this embodiment, the unverified transactions finally obtained by the first backup node and the primary node may be the same, and correspondingly, the first hash value and the second hash value may also be the same. Therefore, after receiving the pre-preparation message sent by the primary node, the first backup node may search for a target key-value pair locally, and the target key-value pair takes the second hash value in the pre-preparation message as the key, or it may be understood that the key of the target key-value pair (i.e. the first hash value) is the same as the second hash value in the pre-preparation message.

In a case where the target key-value pair is found, the value in the target key-value pair (i.e. the first verification result) may be taken out. Then, the first verification result taken from the target key-value pair is compared with the second verification result in the pre-preparation message, that is, to determine whether the verification results obtained by the primary node and the first backup node on the transaction to be put on a blockchain involved in this round of consensus are consistent. If yes, it means that the verification is passed, and the first backup node may broadcast the preparation message in the blockchain system 10, and other backup nodes may perform subsequent consensus processing based on the preparation message broadcast by the first backup node.

Optionally, the pre-preparation message broadcast by the primary node may also include an illegal transaction list, which may be a list obtained by splicing illegal transactions in the at least one unverified transaction.

In an implementation, in a case where the first backup node fails to find the first verification result corresponding to the second hash value in the pre-preparation message based on the corresponding relationship, that is, the target key value pair fails to be found, the first backup node may verify the illegal transaction list in the pre-preparation message to obtain a third verification result. In a case where the third verification result is the same as the second verification result in the pre-preparation message, the first backup node may broadcast the preparation message in the blockchain system 10.

Through the consensus method shown in FIG. 2, in each round of consensus process, the primary node and the at least one backup node in the blockchain system may verify the transactions in the block simultaneously, and the primary node broadcasts the second verification result of this node to the backup node by means of the pre-preparation message in the pre-prepare stage. In a case where the second verification result is the same as the first verification result of this node, the backup node broadcasts the preparation message to the outside and enters the prepare stage for subsequent consensus processing, which may improve the consistency of the verification results obtained by the primary node and the backup node on the transactions in the block while speeding up the consensus process and improving the consensus efficiency.

Further, in S180 of the above embodiment, the first backup node broadcasting the preparation message in the blockchain system may be realized by the following steps:

excluding the illegal transaction from the at least one unverified transaction, and broadcasting the preparation message in the blockchain system for legal transactions in the at least one unverified transaction.

After broadcasting the preparation message, the first backup node enters the prepare stage, and waits for and collects the preparation message in the prepare stage; in a case where the collected preparation messages reach a first predetermined number, the first backup node broadcasts a commitment message in the blockchain system 10, and enters a commit stage; the first backup node waits for and collects the commitment message in the commit stage; and in a case where the collected commitment messages reach a second predetermined number, it is determined that the blockchain system 10 reaches a consensus on the legal transactions in the at least one unverified transaction, and a block formed based on the legal transactions is added to a local blockchain (which may be understood as "data to disk").

In the embodiments of the disclosure, the first predetermined number may be 2f and the second predetermined number may be 2f+1. It is noted that the preparation message collected by the first backup node may include a preparation message broadcast by a second backup node, and may also include the preparation message broadcast by the first backup node itself. Similarly, the commitment message collected by the first backup node may include a commitment message broadcast by the primary node and a commitment message broadcast by the second backup node, and may also include the commitment message broadcast by the first backup node itself.

In this embodiment, the primary node may also receive preparation messages broadcast by the backup nodes in the blockchain system, and broadcast a commitment message in the blockchain system in a case where the received preparation messages reach the first predetermined number; and receive commitment messages broadcast by the backup nodes in the blockchain system, and add the block based on the legal transactions in the at least one unverified transaction to the local blockchain in a case where the received commitment messages reach the second predetermined number. As an example, the primary node may exclude the illegal transaction from the at least one unverified transaction. Moreover, after broadcasting the pre-preparation message, the primary node enters the pre-prepare stage, and waits for and collects the pre-preparation message broadcast by the first backup node in the pre-prepare stage. In a case where the collected pre-preparation messages reach the first predetermined number, the primary node broadcasts a commitment message in the blockchain system 10 for the legal transactions in the at least one unverified transaction, and then enters the commit stage. The primary node waits for and collects the commitment message in the commit stage; and in a case where the collected commitment messages reach a second predetermined number, it is determined that the blockchain system 10 reaches a consensus on the legal transactions in the at least one unverified transaction, and a block formed based on the legal transactions is added to a local blockchain (that is, "data to disk").

Here, the commitment message collected by the primary node in the commit stage may include the commitment message broadcast by at least one backup node in the blockchain system 10, and may also include the commitment message broadcast by the primary node itself.

Figure 3:
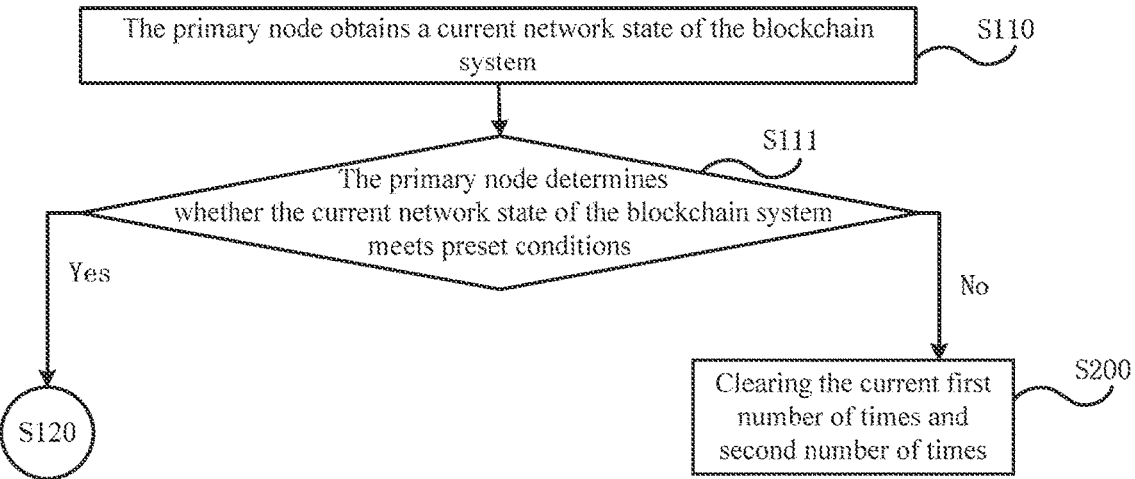
FIG. 3 is a flowchart of another embodiment of a consensus method of the disclosure.

In some optional embodiments, the consensus method disclosed in this embodiment may further comprise steps S110, S111 and S200 shown in FIG. 3 before S120.

In S110, the primary node obtains a current network state of the blockchain system.

In an optional example, S110 may be executed by a processor calling corresponding instructions stored in a memory, or may be executed by a broadcasting module controlled by the processor.

In S111, the primary node determines whether the current network state of the blockchain system meets preset conditions. If yes, the primary node triggers the execution of S120. If not, the primary node may execute S200.

In an optional example, S111 may be executed by a processor calling corresponding instructions stored in a memory, or may be executed by a broadcasting module controlled by the processor.

In this embodiment, "triggering the execution" of a step may be understood as jumping to that step.

Thus, as described above, the backup node may acquire the at least one unverified transaction from the local transaction pool.

Figure 4:
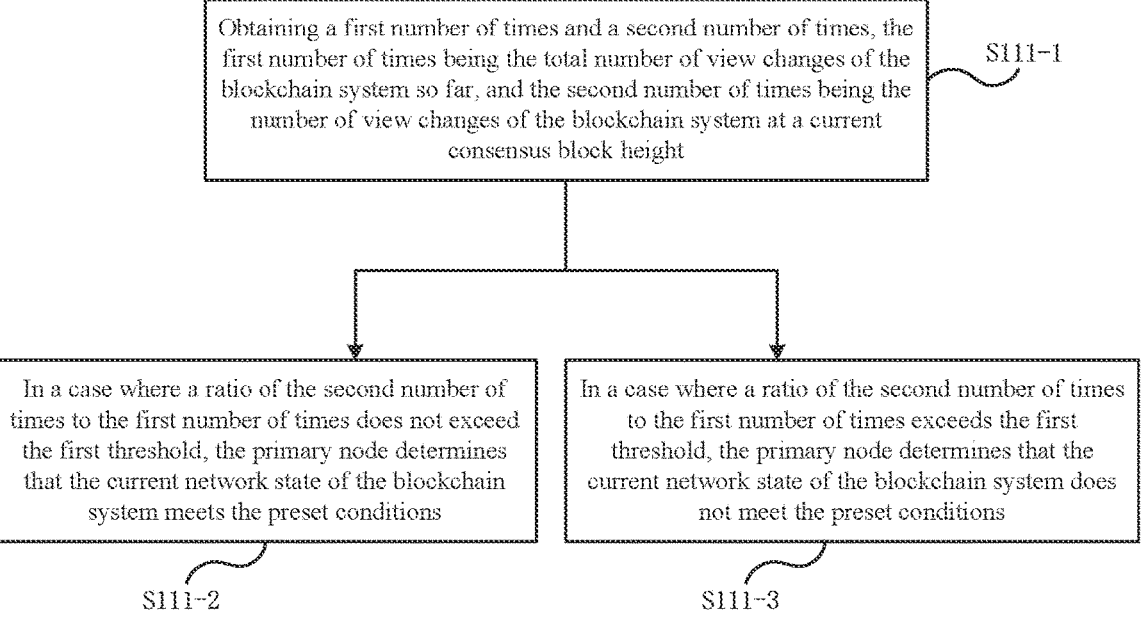
FIG. 4 is a flowchart of step S111 in the embodiment shown in FIG. 3.

Optionally, S110 may be implemented through sub-steps shown in FIG. 4. The details are as follows.

In S111-1, a first number of times and a second number of times are obtained, wherein the first number of times is the total number of view changes of the blockchain system so far, and the second number of times is the number of view changes of the blockchain system at a current consensus block height.

In an optional example, S111-1 may be executed by a processor calling corresponding instructions stored in a memory, or may be executed by a broadcasting module controlled by the processor.

In S111-2, in a case where a ratio of the second number of times to the first number of times does not exceed a first threshold, the primary node determines that the current network state of the blockchain system meets the preset conditions.

In an optional example, S111-2 may be executed by a processor calling corresponding instructions stored in a memory, or may be executed by a broadcasting module controlled by the processor.

In S111-3, in a case where the ratio of the second number of times to the first number of times exceeds the first threshold, the primary node determines that the current network state of the blockchain system does not meet the preset conditions.

In an optional example, S111-3 may be executed by a processor calling corresponding instructions stored in a memory, or may be executed by a broadcasting module controlled by the processor.

In this embodiment, in a case where the primary node suffers a failure or the backup node suspects that the primary node is in an abnormal state, a view change will be triggered. The primary node may accumulate the total number of view changes, for example, every time a view change occurs, the first number of times increases by 1. The primary node may also accumulate the number of view changes at any consensus block height. For example, with the current consensus block height, every time a view change occurs, the second number of times increases by 1.

In an implementation, in a case of determining the current network state of the blockchain system 10, the primary node obtains the current first number of times and second number of times and calculates the ratio of the two. This ratio may represent the current network state of the blockchain system 10. In a case where the ratio of the second number of times to the first number of times does not exceed the first threshold, it means that the current network state of the blockchain system 10 is good, that is, the preset conditions are met, so that S120 may be executed.

In S200, the current first number of times and second number of times are cleared.

In an optional example, S200 may be executed by a processor calling corresponding instructions stored in a memory, or may be executed by a broadcasting module controlled by the processor.

In this embodiment, in a case where the current network state of the blockchain system does not meet the preset conditions, consensus processing is performed according to the preset PBFT consensus process, and the current first number of times and second number of times are cleared.

In a case where the ratio of the second number of times to the first number of times exceeds the first threshold, it indicates that the current network state of the blockchain system 10 is poor, that is, the preset conditions are not met. At this time, the primary node may clear the current first number of times and second number of times, that is, the first number of times and second number of times are reaccumulated again. Moreover, consensus processing may be performed according to the preset PBFT consensus process, and the preset PBFT algorithm herein may be a PBFT algorithm in the related art. For example, each round of consensus of the PBFT algorithm in the related art may correspond to a view, and each view usually comprises a primary node and at least one backup node. A round of consensus usually comprises five stages for request stage, pre-prepare stage, prepare stage, commit stage, and reply stage.

Figure 5:
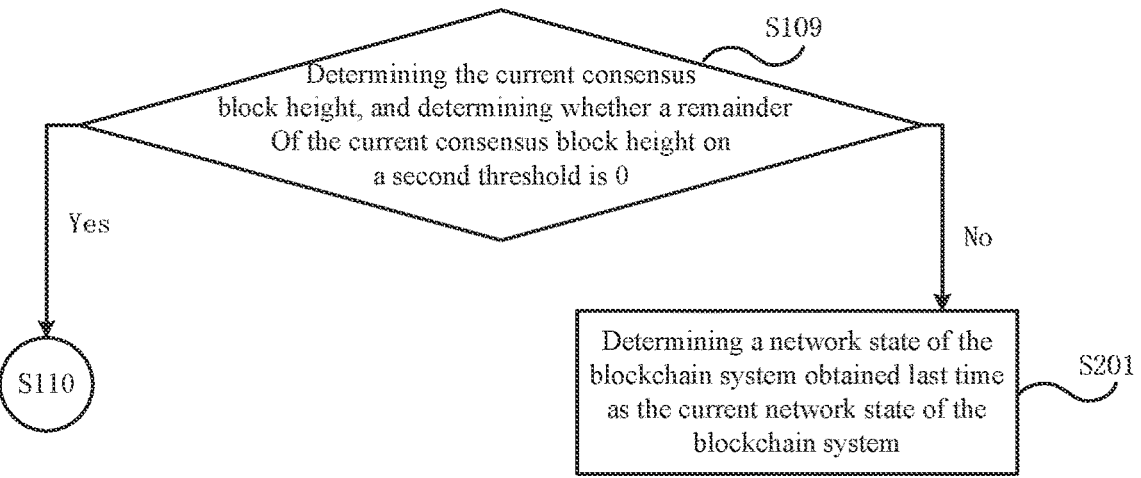
FIG. 5 is a flowchart of another embodiment of a consensus method of the disclosure.

Optionally, in this embodiment, a condition for checking the network state may be set, that is, in a case where this condition is met, the primary node executes S110. Based on this, before S110, the consensus method provided by this embodiment may further comprise steps S109 and S201 shown in FIG. 5.

In S109, the current consensus block height is determined, and it is determined whether a remainder of the current consensus block height on a second threshold is 0; if so, an execution of S110 is triggered; and if not, S201 and S111 are executed.

In an optional example, S109 may be executed by a processor calling corresponding instructions stored in a memory, or may be executed by a broadcasting module controlled by the processor.

The second threshold here is a network judgment threshold, and may be set flexibly as needed or determined through statistical tests, which is not limited in this embodiment.

In S201, a network state of the blockchain system obtained last time is determined as the current network state of the blockchain system.

In an optional example, S201 may be executed by a processor calling corresponding instructions stored in a memory, or may be executed by a broadcasting module controlled by the processor.

By means of the above design, the situation that a backup node obtains the original transaction data of unverified transactions from other backup nodes may be reduced, and network transmission may be reduced.

Optionally, even in a case where the network state is good, that is, in a case where the preset conditions are met, there may be still such a situation that the unverified transaction corresponding to the hash value in the transaction hash list broadcast by the primary node does not exist in the local transaction pool of the first backup node. Based on this, the consensus method disclosed in this embodiment may further comprise the following step:

in a case where the first backup node fails to find the at least one unverified transaction based on the transaction hash list, requesting the unverified transaction from the primary node or any second backup node.

In an optional example, this step may be executed by a processor calling corresponding instructions stored in a memory, or may be executed by a second verification module controlled by the processor.

In a case where the first backup node fails to acquire the corresponding unverified transaction from the local transaction pool based on the hash value in the transaction hash list, the first backup node may send an acquisition request for the unverified transaction to the primary node or the second backup node, and the acquisition request may carry the hash value of the unverified transaction. In this way, the primary node or the second backup node may provide the original transaction data of the unverified transaction to the first backup node for subsequent verification by the first backup node.

In an example, the blockchain node 100 in the blockchain system 10 is a primary node, the blockchain node 101, the blockchain node 102 and the blockchain node 103 are backup nodes, and the blockchain node 103 is a Byzantine node.

The primary node 100 determines whether the current consensus block height is a network state checkpoint. For example, a remainder may be performed on a preset network judgment threshold by the current consensus block height; in a case where the result is 0, it is determined that the current consensus block height is a network state checkpoint; otherwise, it is determined that the current consensus block height is not a network state checkpoint.

In a case where the current consensus block height is not a network state checkpoint, the number of view changes V1 between the current consensus block height and the next network checkpoint and the number of view changes V2 under the current consensus block height are counted, and the last network state determination result is used.

In a case where the current consensus block height is a network state checkpoint, the current V1 and V2 are obtained and V1/V2 is calculated; whether V1/V2 exceeds a network state determination threshold is determined; if yes, it means that the current network state is poor; if not, it means that the current network state is good; and the current V1 and V2 are cleared after obtaining the network state.

The consensus process corresponding to the consensus method in the embodiment of the disclosure comprises a pre-block stage, a pre-prepare stage, a prepare stage and a commit stage, and may for example comprise the following steps.

Figure 6:
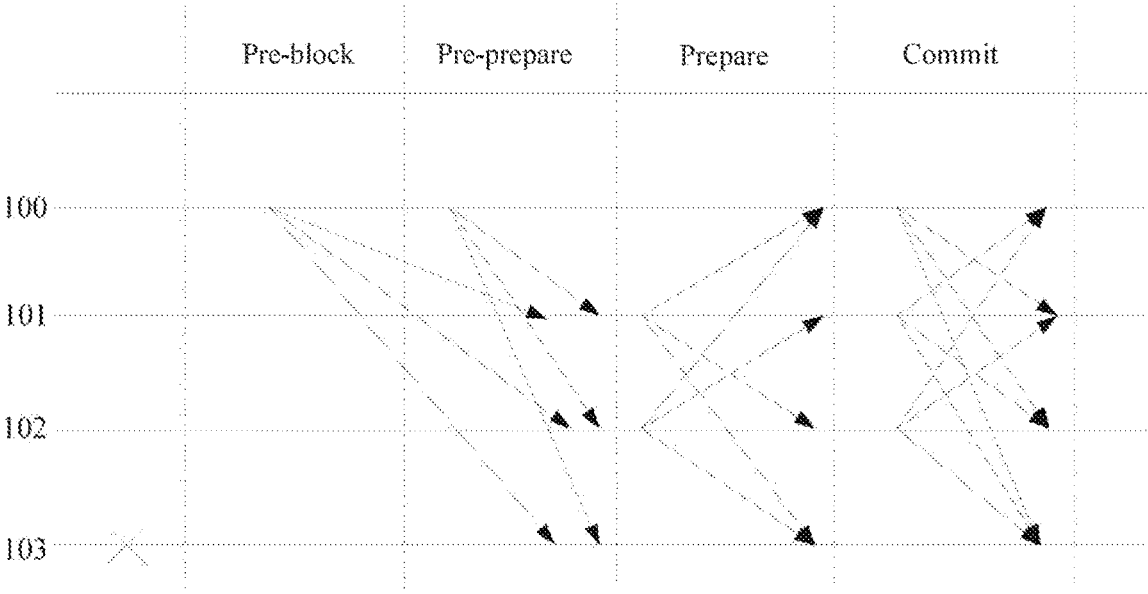
FIG. 6 is a diagram of a consensus process of a blockchain system disclosed in an embodiment of the disclosure.
Figure 7:
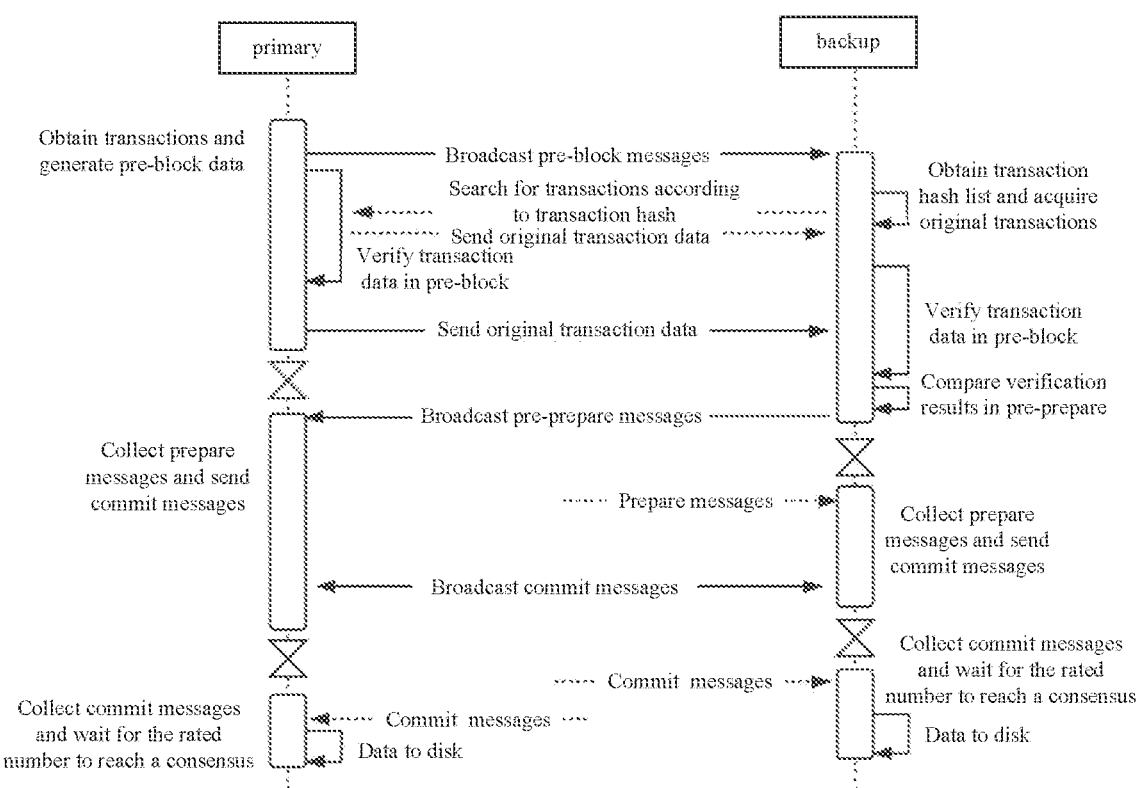
FIG. 7 is a timing diagram of a consensus process of a blockchain system disclosed in an embodiment of the disclosure.

Please refer to FIG. 6 and FIG. 7 together. FIG. 6 shows a diagram of a consensus process applying the consensus method disclosed in the embodiment of the disclosure in the blockchain system 10, and FIG. 7 shows a timing diagram of the blockchain node 100 as the primary node and the first backup node (for example, the blockchain node 101 or the blockchain node 102 or the blockchain node 103). The introduction below is made with reference to FIGS. 6 and 7.

In a first step, a pre-block message is generated.

1. A primary node is selected from a block verifier set. As an example, the current view number and the number of blockchain nodes (backup number) may be used for modular operation, and the obtained result may be used as an index of a block verifier. A block verifier selected from the block verifier set by using this index is the primary node of this round of consensus.

2. The primary node obtains a transaction hash list from a transaction pool, generates an original request block, and broadcasts the transaction hash list using the pre-block message. The transaction hash list includes a transaction hash value of at least one unverified transaction that needs to be packaged into a block in this round.

In a second step, a pre-block generated by the primary node is verified.

1. After broadcasting the pre-block message, the primary node sequentially acquires unverified transactions from the local transaction pool according to the transaction hash values in the transaction hash list, splices the acquired transactions into a pre-block transaction list, and verifies transactions in the pre-block transaction list; after the verification, excludes illegal transactions from the pre-block transaction list to obtain a pre-accurate transaction list; generates validation data of an illegal transaction list (which may be used as the second validation result in the above embodiment); regenerates a pre-preparation message (which may be used as the second hash value in the above embodiment), which carries the illegal transaction list, the verification data and hash values of the original pre-block transaction list; and broadcasts a pre-preparation message. The primary node enters a pre-prepare state and waits for a preparation message sent by a backup node.

2. After receiving the pre-block message, a first backup node acquires corresponding unverified transactions from the local transaction pool according to each transaction hash value in the transaction hash list in the pre-block message. In a case where acquisition from the local transaction pool fails, the first backup node may request the unverified transaction corresponding to the transaction hash value from other nodes (such as the primary node or a second backup node).

As shown in FIG. 7, the first backup node may carry the transaction hash value corresponding to the unverified transaction that fails to be acquired from the local transaction pool in a request and send it to the primary node, and the primary node may search for original transaction data of the corresponding unverified transaction based on the transaction hash value and send it to the first backup node. The first backup node then splices the unverified transaction sent by the primary node into the pre-block transaction list and verifies the pre-block transaction list.

After the verification, the first backup node determines illegal transactions from the pre-block transaction list, and generates verification data of the illegal transaction list (which may be used as the first verification result in the above embodiment). A key-value pair is formed with the hash value of the original pre-block transaction list (which may be used as the first hash value in the above embodiment) as the key and the verification data as the value, and the key-value pair is cached locally.

In this example, the first verification result includes verification result information of the backup node for illegal transactions in the at least one unverified transaction, and the second verification result includes verification result information of the primary node for illegal transactions in the at least one unverified transaction.

In a third step, a pre-preparation block generated by the primary node is verified. After receiving the pre-preparation message sent by the primary node, the first backup node searches for corresponding verification data from a local cache according to the hash value in the pre-preparation message.

1. In a case where the corresponding verification data are found from the local cache, the found verification data are compared with the verification data of the illegal transaction list carried in the pre-preparation message, and in a case where they are consistent, it is determined that the verification is passed.

2. In a case where the corresponding verification data are not found in the local cache, verification is performed according to the transaction list in the pre-preparation message to obtain the verification data of the illegal transaction list, which are compared with the verification data in the pre-preparation message. In a case where they are consistent, it is determined that the verification is passed.

3. In a case where the verification is passed, the first backup node broadcasts a preparation message and collects preparation messages from other nodes; and in a case where a first predetermined number of preparation messages are collected, the first backup node enters a prepare state, broadcasts a commitment message, and collects commitment messages broadcast by other nodes.

In a fourth step, the primary node and each backup node, after collecting a second predetermined number of commitment messages, write blocks into a database (that is, data to disk), and this round of consensus is over.

Any consensus method disclosed in the embodiments of the disclosure may be executed by any appropriate equipment with data processing capability, including but not limited to: terminal equipment and servers. Alternatively, any consensus method disclosed in the embodiments of the disclosure may be executed by a processor, for example, the processor executes any consensus method disclosed in the embodiments of the disclosure by calling corresponding instructions stored in a memory, which will not be repeated below.

Those ordinary skill in the art may understand that all or part of the steps for implementing the above method embodiment may be completed by hardware related to program instructions, the aforementioned program may be stored in a computer readable storage medium, and when executed, the program performs the steps included in the above method embodiment; and the aforementioned storage media include various media such as ROM, RAM, magnetic disk or optical disk which may store program codes.

Figure 8:
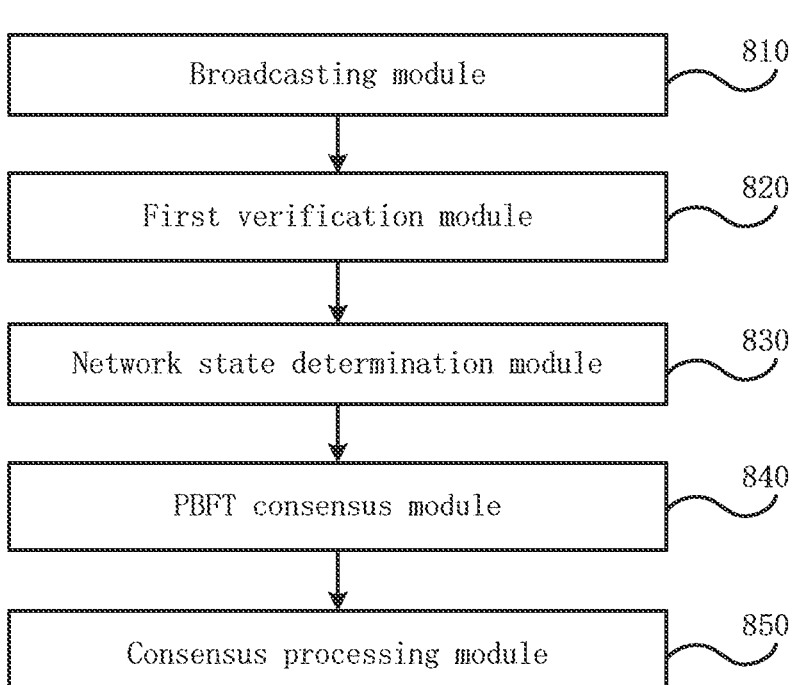
FIG. 8 is a structural diagram of an embodiment of a consensus device of the disclosure.

Please refer to FIG. 8, which is a structural diagram of an embodiment of a consensus device of the disclosure, and the consensus device of this embodiment may be configured to implement the above-mentioned method embodiments of the disclosure. As shown in FIG. 8, consensus device 800 may be applied to the primary node in the blockchain system 10 in FIG. 1, and the consensus device 800 may comprise a broadcasting module 810 and a first verification module 820.

The broadcasting module 810 is configured to broadcast a transaction hash list in the blockchain system 10, so that a backup node in the blockchain system 10 receives the transaction hash list, the transaction hash list comprising a hash value of at least one unverified transaction; to search for the at least one unverified transaction based on the transaction hash list, to verify the at least one unverified transaction to obtain a first verification result, to obtain a first hash value based on the at least one unverified transaction, and to save a corresponding relationship between the first verification result and the first hash value.

The first verification module 820 is configured to search for the at least one unverified transaction based on the transaction hash list, to verify the at least one unverified transaction to obtain a second verification result, and to obtain a second hash value based on the at least one unverified transaction.

The broadcasting module 810 is further configured to broadcast a pre-preparation message in the blockchain system 10, so that the backup node searches for a first verification result corresponding to the second hash value based on the corresponding relationship, the pre-preparation message comprising the second verification result and the second hash value; and to broadcast a preparation message in the blockchain system in a case where the searched first verification result is the same as the second verification result, the preparation message being used for consensus processing by the primary node and the backup nodes in the blockchain system 10.

Optionally, the consensus device 800 may further comprise a network state determination module 830.

The network state determination module 830 is configured to obtain a current network state of the blockchain system 10 before broadcasting a transaction hash list in the blockchain system 10 by the broadcasting module 810, to determine whether the current network state meets preset conditions, and if so, to trigger the broadcasting module 810 to broadcast the transaction hash list in the blockchain system 10.

Optionally, the network state determination module 830 may determine whether the current network state of the blockchain system 10 meets the preset conditions by:

obtaining a first number of times and a second number of times which are currently accumulated, wherein the first number of times is the total number of view changes of the blockchain system 10 so far, and the second number of times is the number of view changes of the blockchain system 10 at a current consensus block height; and in a case where the ratio of the second number of times to the first number of times does not exceed a first threshold, determining that the current network state of the blockchain system meets the preset conditions, and clearing the current first number of times and second number of times.

Optionally, the consensus device 800 may further comprise a PBFT consensus module 840.

The PBFT (Practical Byzantine) consensus module 840 is configured to perform consensus processing according to the preset PBFT consensus process in a case where the current network state of the blockchain system 10 does not meet the preset conditions, and to clear the current first number of times and second number of times.

Optionally, before determining whether the current network state of the blockchain system 10 meets the conditions, the network state determination module 830 may further be configured to:

determine a current consensus block height; and in a case where a remainder of the current consensus block height on a second threshold is 0, trigger the execution of determining whether the current network state of the blockchain system 10 meets the conditions.

Optionally, the consensus device 800 may further comprise a consensus processing module 850.

The consensus processing module 850 is configured to receive preparation messages broadcast by the backup nodes in the blockchain system 10, and to broadcast a commitment message in the blockchain system 10 in a case where the received preparation messages reach a first predetermined number; and to receive commitment messages broadcast by the backup nodes in the blockchain system 10, and to add the block based on the legal transactions in the at least one unverified transaction to the local blockchain in a case where the received commitment messages reach a second predetermined number.

For the example implementations of the above-mentioned modules, please refer to the detailed description of relevant method steps above, which will not be repeated here.

Figure 9:
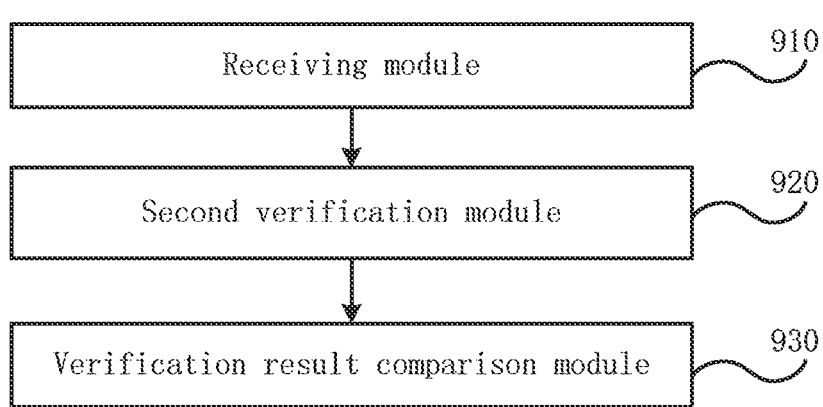
FIG. 9 is a structural diagram of another embodiment of a consensus device of the disclosure.
Figure 10:
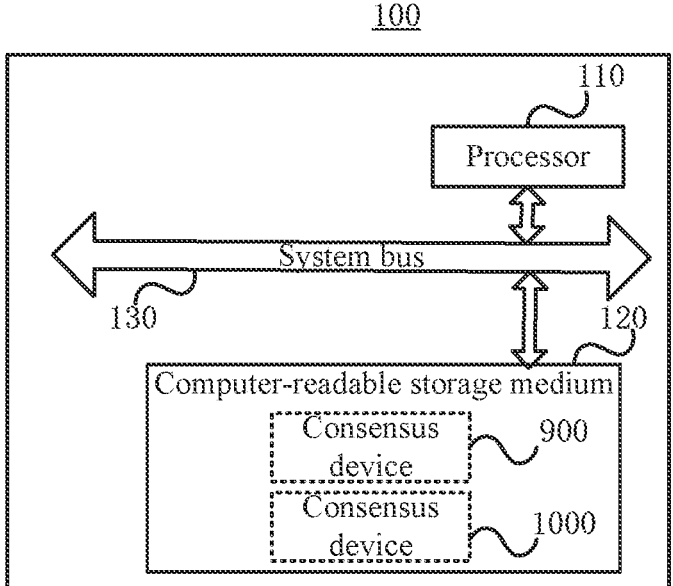
FIG. 10 is a frame diagram of a blockchain node disclosed in an embodiment of the disclosure.

Please refer to FIG. 9, which is a structural diagram of another embodiment of a consensus device of the disclosure, and the consensus device of this embodiment may be configured to realize the above-mentioned method embodiments of the disclosure. As shown in FIG. 10, the consensus device 900 may be applied to the first backup node in the blockchain system. It may be understood that the first backup node is any backup node in the blockchain system 10, and the blockchain system 10 also comprises a primary node.

The consensus device 900 may comprise a receiving module 910, a second verification module 920 and a verification result comparison module 930.

The receiving module 910 is configured to receive a transaction hash list broadcast by the primary node, the transaction hash list comprising a hash value of at least one unverified transaction.

The second verification module 920 is configured to search for the at least one unverified transaction based on the transaction hash list, to verify the at least one unverified transaction to obtain a first verification result, to obtain a first hash value based on the at least one unverified transaction, and to save a corresponding relationship between the first verification result and the first hash value.

The receiving module 910 is further configured to receive a pre-preparation message broadcast by the primary node, the pre-preparation message comprising a second verification result obtained by verifying the at least one unverified transaction by the primary node and a second hash value obtained based on the at least one unverified transaction.

The verification result comparison module 930 is configured to search for a first verification result corresponding to the second hash value in the pre-preparation message based on the corresponding relationship, and to broadcast a preparation message in the blockchain system in a case where the first verification result is the same as the second verification result, the preparation message being used for consensus processing by the primary node and at least one backup node in the blockchain system.

Optionally, the blockchain system 10 may further comprise a second backup node, which is a backup node different from the first backup node. The second verification module 920 may also be configured to:

in a case where the at least one unverified transaction fails to be found based on the transaction hash list, request the unverified transaction from the primary node or any second backup node.

Optionally, the pre-preparation message further includes an illegal transaction list, and the legal transaction list includes illegal transactions in the at least one unverified transaction.

Correspondingly, the verification result comparison module 930 may also be configured to:

verify the illegal transaction list to obtain a third verification result in a case where the first verification result corresponding to the second hash value in the pre-preparation message fails to be found based on the corresponding relationship; and broadcast a preparation message in the blockchain system in a case where the third verification result is the same as the second verification result in the preparation message.

For an example implementation of the above-mentioned modules, please refer to the detailed description of relevant method steps above, which will not be repeated here.

Please refer to FIG. 10, which is a frame diagram of a blockchain node disclosed in an embodiment of the disclosure, and the blockchain node may be configured to realize the above-mentioned method embodiments of the disclosure. As shown in FIG. 10, a hardware architecture diagram of a blockchain node disclosed in an embodiment of the disclosure is provided by taking the blockchain node 100 as an example. The blockchain node 100 may comprise the consensus devices 800 and 900 described above, a processor 110, and a computer-readable storage medium 120.

The processor 110 and the computer-readable storage medium 120 may communicate through a system bus 130. Software modules of the consensus devices 800 and 900 may be stored in the machine-readable storage medium 120 in the form of machine-executable instructions. The processor 110 may implement the consensus method disclosed in the embodiment of the disclosure by calling and reading the machine-executable instructions in the computer-readable storage medium 120.

It is noted that the architecture shown in FIG. 10 is only schematic. The blockchain node 100 provided by the embodiment of the disclosure may also comprise more or fewer components than those shown in FIG. 10, for example, it may also comprise a communication module, or it may have a completely different matching value from that shown in FIG. 10, which is not limited by this embodiment. Further, the components shown in FIG. 10 may be implemented by hardware, software, or a combination thereof.

It is noted that the architecture shown in FIG. 10 is only an optional implementation. In practice, the number and types of components in FIG. 10 may be selected, deleted, added or replaced according to actual needs. Different components may be arranged separately or integrally, for example, GPU and CPU may be arranged separately or GPU may be integrated on CPU, communication components may be arranged separately or integrated on CPU or GPU, and so on. These alternative embodiments all fall within the protection scope of this disclosure.

For example, according to the embodiment of the disclosure, the process described above with reference to the flowchart may be implemented as a computer software program. For example, an embodiment of the disclosure provides a computer program product which comprises a computer program tangibly embodied on a machine-readable medium, the computer program comprises a program code for executing the method shown in the flowchart, and the program code may comprise instructions for executing the method steps disclosed in the embodiment of the disclosure, for example including: broadcasting a transaction hash list in the blockchain system, so that a backup node in the blockchain system receives the transaction hash list, the transaction hash list comprising a hash value of at least one unverified transaction; searching for the at least one unverified transaction based on the transaction hash list, verifying the at least one unverified transaction to obtain a first verification result, obtaining a first hash value based on the at least one unverified transaction, and saving a corresponding relationship between the first verification result and the first hash value; searching for the at least one unverified transaction based on the transaction hash list, verifying the at least one unverified transaction to obtain a second verification result, and obtaining a second hash value based on the at least one unverified transaction; broadcasting a pre-preparation message in the blockchain system, so that the backup node searches for a first verification result corresponding to the second hash value based on the corresponding relationship, the pre-preparation message comprising the second verification result and the second hash value; and broadcasting a preparation message in the blockchain system in a case where the searched first verification result is the same as the second verification result, the preparation message being used for consensus processing by the primary node and the backup nodes in the blockchain system.

All the embodiments in this specification are described in a progressive way, and each embodiment focuses on the differences from other embodiments. The same and similar parts among the embodiments are referable to one another. As the above system embodiments are substantially similar to the method embodiments, the description is relatively simple, and please refer to the description of the method embodiments for relevant information.

The method and device of the disclosure may be implemented in many ways. For example, the method and device of the disclosure may be implemented by software, hardware, firmware, or any combination thereof. The above order of steps in the method is only for illustration, and the steps of the method of the disclosure are not limited to the order described above, unless otherwise specified. Further, in some embodiments, the disclosure may also be implemented as programs recorded in a recording medium, which include machine-readable instructions for implementing the method according to the disclosure. Thus, the disclosure also covers a recording medium storing programs for executing the method according to the disclosure. The description of the disclosure has been presented for purposes of illustration and description, and is not exhaustive or intended to limit the disclosure to the disclosed form. Many modifications and variations will be obvious to those skilled in the art. The embodiments are chosen and described in order to better explain the principles and practical application of the disclosure, and to enable those skilled in the art to understand the disclosure and design various embodiments with various modifications that are suited to the practical use.

What is claimed is:

1. A consensus method performed by a blockchain system, wherein the blockchain system comprising a primary node and a backup node, the method comprising:
broadcasting, by the primary node, a transaction hash list in the blockchain system, wherein the transaction hash list comprising a hash value of at least one unverified transaction;
receiving, by the backup node, the transaction hash list;
searching, by the backup node, for the at least one unverified transaction based on the transaction hash list;
verifying, by the backup node, the at least one unverified transaction to obtain a first verification result;
obtaining, by the backup node, a first hash value based on the at least one unverified transaction;
saving, by the backup node, a corresponding relationship between the first verification result and the first hash value;
searching, by the primary node, for the at least one unverified transaction based on the transaction hash list;
verifying, by the primary node, the at least one unverified transaction to obtain a second verification result;
obtaining, by the primary node, a second hash value based on the at least one unverified transaction;
broadcasting, by the primary node, a pre-preparation message in the blockchain system, the pre-preparation message comprising the second verification result and the second hash value, wherein the backup node receives the pre-preparation message and searches for the first verification result corresponding to the second hash value based on the corresponding relationship; and
broadcasting, by the backup node, a preparation message in the blockchain system based on determining that the searched first verification result is the same as the second verification result, wherein the preparation message is used for consensus processing by the primary node and the backup node in the blockchain system; and
wherein before broadcasting the transaction hash list in the blockchain system, the method further comprises:
obtaining, by the primary node, a current network state of the blockchain system;
determining, by the primary node, whether the current network state meets preset conditions; and
triggering the broadcasting the transaction hash list in the blockchain system based on determining that the current network state meets preset conditions.

2. The consensus method according to claim 1, wherein the determining whether the current network state meets preset conditions comprises:
obtaining a first number of times and a second number of times which are currently accumulated, the first number of times being the total number of view changes of the blockchain system so far, and the second number of times being the number of view changes of the blockchain system at a current consensus block height; and
based on determining that a ratio of the second number of times to the first number of times does not exceed a first threshold, determining that the current network state of the blockchain system meets the preset conditions, and clearing the current first number of times and second number of times.

3. The consensus method according to claim 2, further comprising:
based on determining that the current network state of the blockchain system does not meet the preset conditions, performing consensus processing according to a preset PBFT consensus process, and clearing the current first number of times and second number of times.

4. The consensus method according to claim 1, wherein before determining whether the current network state meets preset conditions, the method further comprises:
determining a current consensus block height; and
based on determining that a remainder of the current consensus block height on a second threshold is 0, triggering the determining whether the current network state of the blockchain system meets the conditions.

5. The consensus method according to claim 1, wherein the first verification result comprises verification result information of the backup node for illegal transactions in the at least one unverified transaction, and the second verification result comprises verification result information of the primary node for illegal transactions in the at least one unverified transaction.

6. The consensus method according to claim 1, wherein after broadcasting the preparation message in the blockchain system, the method further comprises:
receiving preparation messages broadcast by the backup node in the blockchain system, and broadcasting a commitment message in the blockchain system based on determining that the received preparation messages reach a first predetermined number; and receiving commitment messages broadcast by the backup node in the blockchain system, and adding a block based on legal transactions in the at least one unverified transaction to a local blockchain based on determining that the received commitment messages reach a second predetermined number.

7. A consensus method performed by a first backup node in a blockchain system, the blockchain system further comprising a primary node, the method comprising:

receiving a transaction hash list broadcast by the primary node, wherein the transaction hash list comprising a hash value of at least one unverified transaction;

searching for the at least one unverified transaction based on the transaction hash list;

verifying the at least one unverified transaction to obtain a first verification result;

obtaining a first hash value based on the at least one unverified transaction;

saving a corresponding relationship between the first verification result and the first hash value;

receiving a pre-preparation message broadcast by the primary node, wherein the pre-preparation message comprising a second verification result obtained by verifying the at least one unverified transaction by the primary node and a second hash value obtained based on the at least one unverified transaction;

searching for the first verification result corresponding to the second hash value in the pre-preparation message based on the corresponding relationship;

broadcasting a preparation message in the blockchain system based on determining that the searched first verification result is the same as the second verification result, wherein the preparation message is used for consensus processing by the primary node and at least one backup node in the blockchain system; and wherein the blockchain system further comprises second backup nodes, the second backup nodes are different from the first backup node, the method further comprises:

based on determining that the first backup node fails to find the at least one unverified transaction based on the transaction hash list, requesting the at least one unverified transaction from the primary node or any one of the second backup nodes.

8. The method according to claim 7, wherein the pre-preparation message further comprises an illegal transaction list, the illegal transaction list comprises illegal transactions in the at least one unverified transaction, and the method further comprises:

verifying the illegal transaction list to obtain a third verification result based on determining that the first verification result corresponding to the second hash value in the pre-preparation message fails to be found based on the corresponding relationship; and broadcasting a preparation message in the blockchain system based on determining that the third verification result is the same as the second verification result.

9. A blockchain system, comprising a primary node and a first backup node, the first backup node being any backup node in the blockchain system, wherein the primary node is configured to broadcast a transaction hash list in the blockchain system, the transaction hash list comprising a hash value of at least one unverified transaction;

the first backup node is configured to receive the transaction hash list, to search for the at least one unverified transaction based on the transaction hash list, to verify the at least one unverified transaction to obtain a first verification result, to obtain a first hash value based on the at least one unverified transaction, and to save a corresponding relationship between the first verification result and the first hash value;

the primary node is further configured to search for the at least one unverified transaction based on the transaction hash list, to verify the at least one unverified transaction to obtain a second verification result, to obtain a second hash value based on the at least one unverified transaction, and to broadcast a pre-preparation message carrying the second verification result and the second hash value in the blockchain system; and the first backup node is further configured to receive the pre-preparation message, to search for the first verification result corresponding to the second hash value based on the corresponding relationship, and to broadcast a preparation message in the blockchain system based on determining that the searched first verification result is the same as the second verification result, the preparation message is used for consensus processing by the primary node and at least one backup node in the blockchain system, wherein before broadcasting the transaction hash list in the blockchain system, the primary node is further configured to determine whether a current network state of the blockchain system meets preset conditions, and trigger the broadcasting the transaction hash list in the blockchain system based on determining that the current network state meets preset conditions.

10. The system according to claim 9, wherein the primary node determines whether the current network state of the blockchain system meets preset conditions by:

obtaining a first number of times and a second number of times which are currently accumulated, the first number of times being the total number of view changes of the blockchain system so far, and the second number of times being the number of view changes of the blockchain system at a current consensus block height; and based on determining that a ratio of the second number of times to the first number of times does not exceed a first threshold, determining that the current network state of the blockchain system meets the preset conditions.

11. The system according to claim 10, wherein the primary node is further configured to clear the current first number of times and second number of times based on determining that the current network state of the blockchain system does not meet the preset conditions.

12. The system according to claim 9, wherein before determining whether the current network state of the blockchain system meets preset conditions, the primary node is further configured to:

determine a current consensus block height, determine whether a remainder of the current consensus block height on a second threshold is 0, and if so, trigger the determining whether the current network state of the blockchain system meets the preset conditions.

13. The system according to claim 9, wherein the first verification result comprises verification result information of the first backup node for illegal transactions in the at least one unverified transaction, and the second verification result comprises verification result information of the primary node for illegal transactions in the at least one unverified transaction.

14. The system according to claim 13, wherein the first backup node broadcasts the preparation message in the blockchain system by: excluding the illegal transaction from the at least one unverified transaction, and broadcasting the preparation message in the blockchain system for legal transactions in the at least one unverified;

the first backup node is further configured to wait for and collect preparation messages after broadcasting the preparation message, and to broadcast a commitment message in the blockchain system based on determining that the collected preparation messages reach a first predetermined number; and to wait for and collect commitment messages, and to determine that the blockchain system reaches a consensus on a block formed by the legal transactions in the at least one unverified transaction based on determining that the collected commitment messages reach a second predetermined number; and the primary node is further configured to exclude the illegal transaction from the at least one unverified transaction; to wait for and collect preparation messages after broadcasting the pre-preparation message, and to broadcast a commitment message in the blockchain system based on determining that the collected preparation messages reach a first predetermined number; and to wait for and collect commitment messages, and to determine that the blockchain system reaches a consensus on a block formed by the legal transactions in the at least one unverified transaction based on determining that the collected commitment messages reach a second predetermined number.

15. The system according to claim 9, wherein the blockchain system further comprises second backup nodes, the second backup nodes are different from the first backup node; and the first backup node is further configured to request the at least one unverified transaction from the primary node or any one of the second backup nodes based on determining that the at least one unverified transaction fails to be found based on the transaction hash list.

16. The system according to claim 9, wherein the pre-preparation message further comprises an illegal transaction list, the illegal transaction list comprises illegal transactions in the at least one unverified transaction, and the first backup node is further configured to:

verity the illegal transaction list to obtain a third verification result based on determining that the first verification result corresponding to the second hash value fails to be found based on the corresponding relationship; and to broadcast a preparation message in the blockchain system based on determining that the third verification result is the same as the second verification result.

* * * * *